United States Patent
Maeda et al.

(10) Patent No.: US 6,311,124 B1
(45) Date of Patent: Oct. 30, 2001

(54) DEVICE, METHOD AND SYSTEM FOR SELECTING EMERGENCY VEHICLES

(75) Inventors: Koichi Maeda; Akio Mukai, both of Kawasaki (JP)

(73) Assignee: Fijitsu Limited, Kawasaki (JP)

( * ) Notice: Subject to any disclaimer, the term of this patent is extended or adjusted under 35 U.S.C. 154(b) by 0 days.

(21) Appl. No.: 09/649,066

(22) Filed: Aug. 29, 2000

(30) Foreign Application Priority Data

Sep. 2, 1999 (JP) .................................................. 11-249223

(51) Int. Cl.$^7$ ..................................................... G06F 17/00
(52) U.S. Cl. ............................. 701/204; 701/1; 340/902; 340/994; 702/5
(58) Field of Search ................................. 701/1, 204, 200; 340/902, 994; 455/404; 379/45; 702/5

(56) References Cited

U.S. PATENT DOCUMENTS 5,832,187 * 11/1998 Pedersen et al. ....................... 395/50
5,987,377 * 11/1999 Westerlage et al. .................. 701/204

FOREIGN PATENT DOCUMENTS 6-290385   10/1994   (JP) .
7-234997    9/1995   (JP) .

* cited by examiner

*Primary Examiner*—William A. Cuchlinski, Jr.
*Assistant Examiner*—Arthur D. Donnelly
(74) *Attorney, Agent, or Firm*—Staas & Halsey LLP (57) ABSTRACT

A device for selecting vehicles to be sent to a site of a fire is provided. The device includes a storage unit provided with a vehicle table and a fire-spreading condition table. Fire-extinguishing ability data and arrival time data for each vehicle are stored in the vehicle table as numerical data. Initial fire power data and fire-spreading rate data are stored in the fire-spreading condition table as numerical data. The device also includes a vehicle organizing part deriving a relationship between total fire-extinguishing ability of vehicles and total fire-spreading power of the fire with respect to time, and selecting vehicles to be sent to the fire site based on the relationship.

11 Claims, 11 Drawing Sheets

|  | FIRE-EXTINGUISHING ABILITY W | UNIT FIRE-EXTINGUISHING POWER (PER MIN) ΔW | ARRIVAL TIME (MIN) T |
|---|---|---|---|
| VEHICLE A | ∞ | 0.2 | 2 |
| VEHICLE B | 5 | 0.4 | 3 |
| VEHICLE C | ∞ | 0.3 | 5 |

|  | FIRE-EXTINGUISHING ABILITY W | UNIT FIRE-EXTINGUISHING POWER (PER MIN) ΔW | ARRIVAL TIME (MIN) T |
|---|---|---|---|
| VEHICLE A | 8 | 0.2 | 2 |
| VEHICLE B | 5 | 0.4 | 3 |
| VEHICLE C | 8 | 0.3 | 5 |

FIG. 5

| SEVERITY LEVEL | SKYSCRAPER | | HOUSE | | VEHICLE | |
|---|---|---|---|---|---|---|
| | F | ΔF | F | ΔF | F | ΔF |
| A | 18 | 1.5 | 15 | 0.7 | 10 | 0.2 |
| B | 10 | 1.0 | 5 | 0.4 | 4 | 0.1 |
| C | 3 | 0.3 | 1 | 0.1 | 1 | 0.1 |

FIG. 7

| t | ARRIVED VEHICLE | Te | Te−t<ΔT |
|---|---|---|---|
| 1 | 0 | WILL NOT EXTINGUISH | — |
| 2 | 0 | WILL NOT EXTINGUISH | — |
| 3 | A | WILL NOT EXTINGUISH | — |
| 4 | A, B | Te4 | FALSE |
| 5 | A, B | Te5 | FALSE |
| 6 | A, B, C | Te6 | TRUE |
| 7 | A, B, C, D | Te7 | TRUE |
| 8 | A, B, C, D | FIRE EXTINGUISED | — |

→ t AND ARRIVED VEHICLES FIRST SATISFYING ΔT

FIG. 8

| t | ARRIVED VEHICLE | Te | Te−t<ΔT |
|---|---|---|---|
| 1~2 | 0 | WILL NOT EXTINGUISH | — |
| 3 | A | WILL NOT EXTINGUISH | — |
| 4 | A, B | Te4 | FALSE |
| 5 | A, B | Te5 | FALSE |
| 6 | A, B, C | Te6 | TRUE |
| 6 | A, B, C, D | Te7 | TRUE |
| 7 | A, B, C, D | Te8 | TRUE |
| 8 | A, B, C, D | FIRE EXTINGUISED | — |

→ t AND ARRIVED VEHICLES FIRST SATISFYING ΔT

| AREA | AVAILABLE | UPPER LIMIT | LOWER LIMIT | OCCUPIED | EXCESS |
|---|---|---|---|---|---|
| STATION 1 | W1 | Wmax 1 | Wmin 1 | Wt1 | −Wf1 |
| STATION 2 | W2 | Wmax 2 | Wmin 2 | 0 | +Wf2 |
| STATION 3 | W3 | Wmax 3 | Wmin 3 | 0 | +Wf3 |

FIG. 11

| AREA | AVAILABLE | UPPER LIMIT | LOWER LIMIT | OCCUPIED | EXCESS |
|---|---|---|---|---|---|
| STATION 1 | W1 | — | — | Wt1 | — |
| STATION 2 | W2 | — | — | 0 | — |
| STATION 3 | W3 | — | — | 0 | — |
| STATION n | Wn | — | — | 0 | — |
| DEPARTMENT | W | Wmax | Wmin | Wt | Wf |

DEVICE, METHOD AND SYSTEM FOR SELECTING EMERGENCY VEHICLES

BACKGROUND OF THE INVENTION

1. Field of the Invention

The present invention generally relates to a method of selecting vehicles and a device and system for implementing such a method, and particularly relates to a method of appropriately selecting vehicles to be sent upon occurrence of a disaster or a fire and a device and system for implementing such a method.

2. Description of the Related Art

In the conventional emergency command system, emergency vehicles to be sent to a disaster are fixedly predetermined based on types and locations of the disaster. Thus, when a disaster is reported through an emergency call, emergency vehicles are selected in accordance with the type and location of the reported disaster. An emergency command including thus-selected emergency vehicles is issued.

Figure 1:
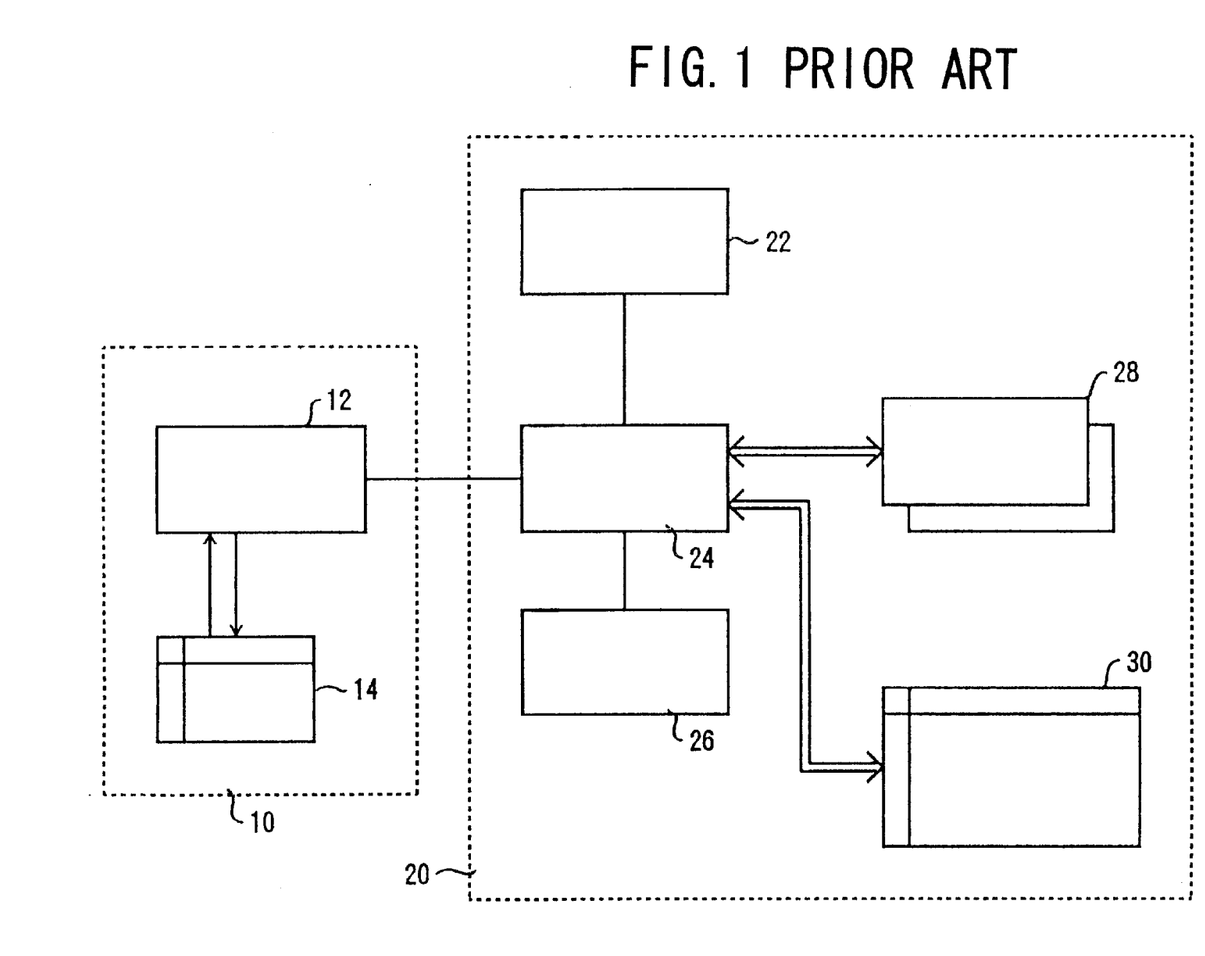
FIG. 1 is a block diagram of a vehicle-selecting device of the related art.

FIG. 1 is a diagram showing an example of a device for selecting emergency vehicles, which device may be a command controller 20.

The command controller 20 includes a man-machine interface 22, a vehicle organizing part 24, a command producing part 26, an affected object file 28, and a vehicle team table 30. When a disaster is reported through an emergency call, an operator questions the reporter to obtain information about the condition, the location and the affected object (e.g., the name of an affected building, the name of an affected forest, etc.,) of the disaster. In the present example, the disaster may be a fire. Then, the operator inputs data of thus-obtained information of the disaster to the command controller 20 via the man-machine interface 22.

The data input via the man-machine interface 22 is supplied to the vehicle organizing part 24. Then, the vehicle organizing part 24 searches for a vehicle team key from the affected object file 28, which key is predetermined for the location and affected object of the disaster. The term "vehicle team" is understood as a team including a plurality of vehicles assigned based on the affected object of the disaster, such that the number of vehicles exceeds a minimum number required to deal with the affected object. The vehicle organizing part 24 then retrieves vehicle data from the vehicle team table 30 using the vehicle team key.

Then, the vehicle organizing part 24 sends the vehicle data to a vehicle management device 10. The vehicle management device 10 includes a vehicle management part 12 having a vehicle management table with which all the vehicles can be managed such that the same vehicle will not be assigned to different disasters. In detail, the vehicle management part 12 checks whether the vehicle corresponding to the vehicle data supplied from the vehicle organizing part 24 has already been assigned to another disaster. If not, the relevant vehicle is reserved as an operational vehicle for the reported disaster.

Upon receiving a message from the vehicle management part 12 announcing that the operational vehicle has been reserved, the vehicle organizing part 24 instructs the command producing part 26 to produce a command for the operational vehicle. The command producing part 26 produces the command for the operational vehicle and sends the command in the form of electronic data to an emergency station to which the operational vehicle belongs and to the operational vehicle itself. The emergency station is a facility such as a main station or a branch station to which emergency vehicles belong. In the following description, the emergency station is also referred to as a "station". The command includes data such as a type of the disaster, an address, affected objects, operational vehicles, and a map.

At the station where the operational vehicle belong, a command tone, a voice signal and the command are output from output means such as a terminal display and a printer. Also, a command tone and a voice signal are sent to the relevant operational vehicle.

In the case of a disaster, the operational vehicles are sent to the location of the disaster. This results in a reduced disaster-handling ability of the station to which the operational vehicles belong and the nearby stations. This may cause a problem if another (or a second) disaster occurs while the operational vehicles are sent to the location of the first disaster. As a result, if the first disaster is severe, since the disaster-handling ability of the area covered by the relevant station will become too small, the operator demands assistance from other stations based on his/her experience. The demand for assistance is submitted by means of a voice message or by an electronic message.

Further, in the case of a more severe disaster, such as an earthquake, the head or the leading member of the station submits the demand for assistance to other geographically remote fire defense organizations by making a telephone call or by other communication means.

Conventionally, since the operational vehicles to be assigned to a disaster are predetermined according to the location and the affected object of the disaster, initially, the number of vehicles reserved as operational vehicles may not be sufficient for the relevant disaster. Therefore, there may be a case where the number of operational vehicles is excessive or insufficient. Particularly, when there is a shortage of operational vehicles, it is necessary to demand assistance vehicles based on the report about the recent state of the disaster. In the case of a fire, the recent state may be a state of spread of the fire. Accordingly, the conventional system has a drawback that an optimal number of operational vehicle cannot be selected in a quick and efficient manner.

Another drawback of the conventional system is that the operational vehicles are organized in teams based on past experience. Therefore, it is difficult to alter the organization of the team in an appropriate manner according to the severity of the current disaster. In addition, it is not possible to assign sufficient number of vehicles at specific locations such as crowded residential areas.

Further, even if the report indicates that the disaster is considerably severe, there is a drawback that the number of operational vehicles cannot be increased easily. In other words, it is necessary to select additional vehicles one at a time from vehicles other than those organized at the vehicle organizing part 24.

Also, when the disaster is considerably severe, since the remaining capability of the vehicles within the relevant region becomes too low, the operator demands assistance from other stations based on his/her experience. The demand of assistance is made based on human decision and not on a uniform decision criteria.

Also, in the case of a more severe disaster, such as an earthquake, the head or the leading member of the station submits the demand for assistance to other geographically remote fire defense organizations by making a telephone call or by other communication means. Therefore, similarly, the demand for assistance is made based on human decision and not on a uniform decision criteria.

SUMMARY OF THE INVENTION

Accordingly, it is a general object of the present invention to provide a device, method and system for selecting vehicles to be sent to the location of disaster which can solve the problems above.

It is another and more specific object of the present invention to provide a device, method and system for automatically selecting vehicles to be sent upon occurrence of a disaster, which may be a fire, according to the state of the disaster and to the disaster handling ability of the vehicle.

In order to achieve the above objects according to the present invention, a device for selecting vehicles to be sent to a site of a fire is provided, the device including:

first means provided with a first table in which fire-extinguishing ability data and arrival time data for each vehicle are stored as numerical data, the arrival time data representing time required for the vehicle to arrive at the fire site, and a second table in which initial fire power data and fire-spreading rate data are stored as numerical data; and second means for deriving a relationship between total fire-extinguishing ability of vehicles and total fire-spreading power of the fire with respect to time, and for selecting vehicles to be sent to the fire site based on the relationship.

With the device described above, since the vehicle table and the fire-spreading condition table, or a disaster condition table are provided, a relationship between total fire-extinguishing ability of vehicles and total fire-spreading power of the fire with respect to time can be derived. Thereby, the change of condition of the disaster, or fire, can be understood accurately, so that an optimal vehicle selection is achieved in accordance with the change of condition of the disaster.

Other objects and further features of the present invention will be apparent from the following detailed description when read in conjunction with the accompanying drawings.

DETAILED DESCRIPTION OF THE PREFERRED EMBODIMENTS

In the following, principles and embodiments of the present invention will be described with reference to the accompanying drawings.

Figure 2:
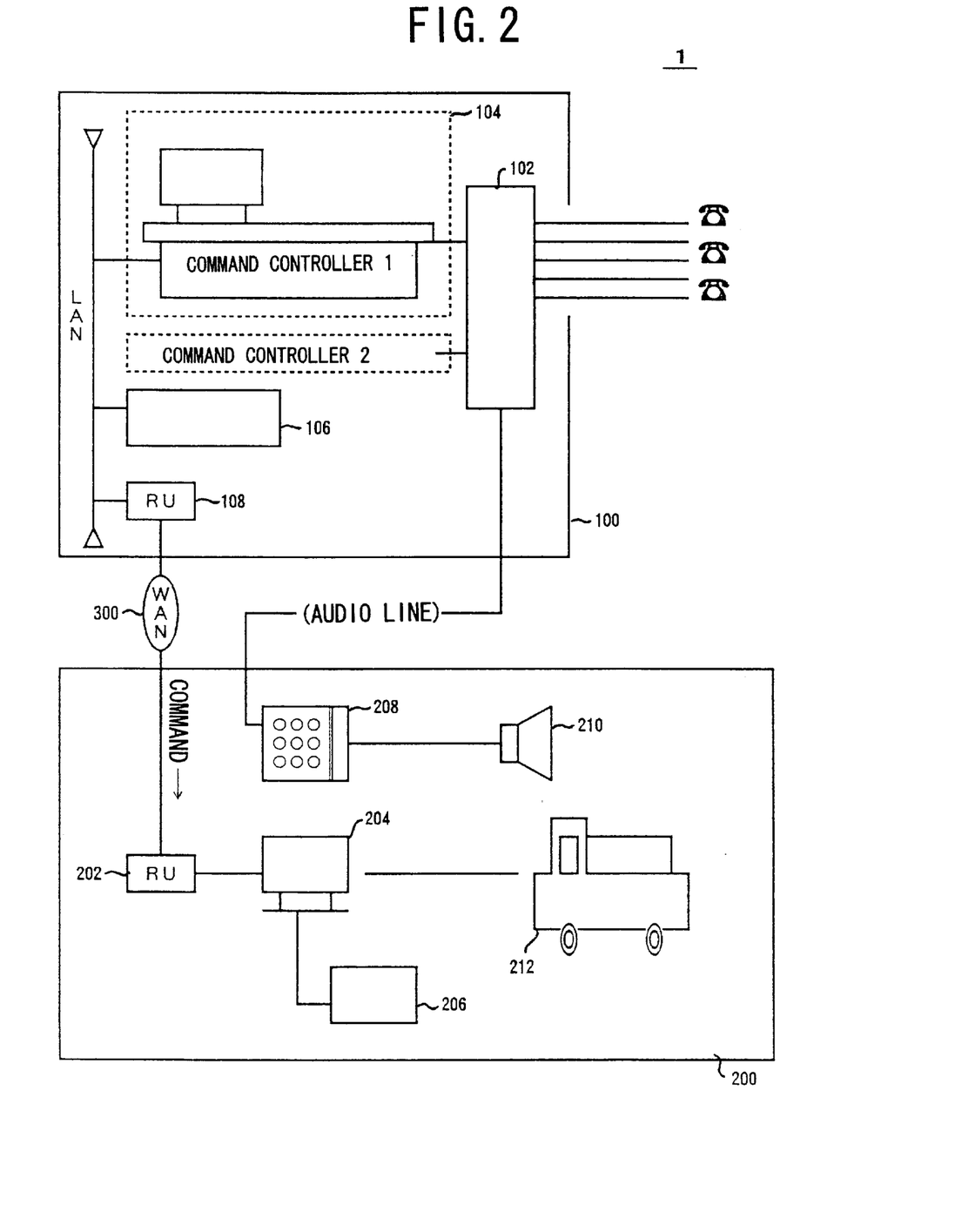
FIG. 2 is a schematic diagram of an emergency command control system of one embodiment of the present invention.

FIG. 2 is a schematic diagram of an emergency command control system 1 of one embodiment of the present invention. An emergency call, which may be a telephone call, from a reporter is supplied to a command center 100 via a command control device 102 and then received at a command controller 104.

Upon receipt of the emergency call at the controller 104, the operator connects the line to the reporter so as to obtain information about the type of the disaster, location of the disaster, and the affected object. For example, if the type of disaster is a fire, the address, the affected object (name of the affected building or forest) and fire-spreading information is obtained. The operator then inputs thus-obtained information into the command controller 104. The data input in the command controller 104 is supplied to a vehicle-selecting device 120 within the command controller 104.

Figure 3:
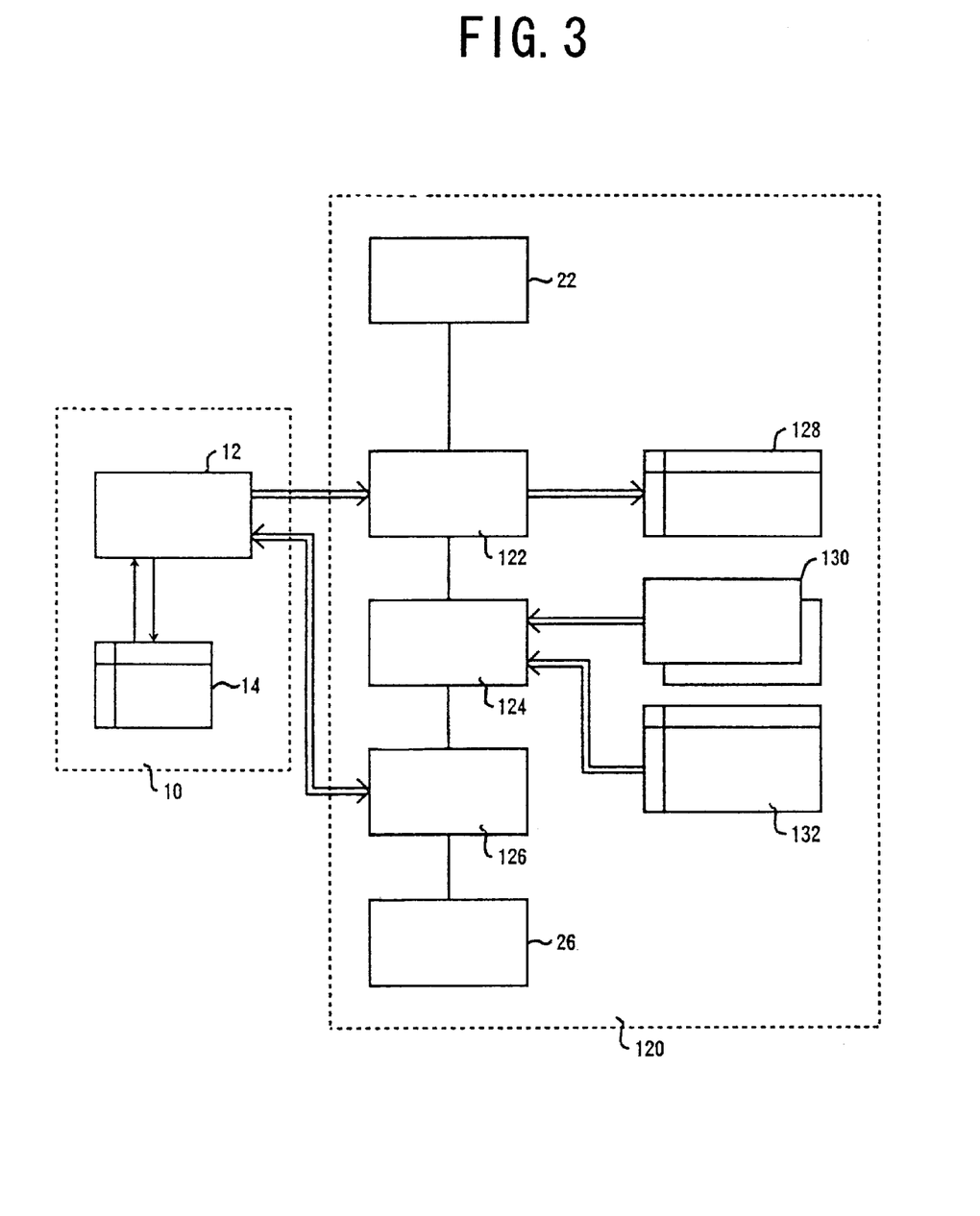
FIG. 3 is a schematic diagram of a vehicle-selecting device of an embodiment of the present invention.

FIG. 3 is a schematic diagram of the vehicle-selecting device 120 of an embodiment of the present invention. In the present embodiment, the vehicle-selecting device 120 is included in the command controller 104, but is not limited to such a location. The vehicle selecting device 120 of FIG. 3 includes a man-machine interface 22, a command producing part 26, a nearest vehicle table producing part 122, an affected object fire-spread data determining part 124, a vehicle organizing part 126, a vehicle evaluation table 128, an affected object file 130, and a fire-spreading condition table 132.

When the operator inputs data related to information about the type of the disaster, the location of the disaster, and the affected object via the command controller 104, the data is supplied to the vehicle selecting device 120 via the man-machine interface 22. Upon receipt of the data input supplied through the man-machine interface 22, the nearest vehicle table producing part 122 produces a nearest vehicle table. The nearest vehicle table is organized such that the vehicle data is arranged in an ascending order of the distance between the station to which the vehicle belongs and the location of the disaster.

Also, the nearest vehicle table producing part 122 accesses a vehicle management part 12 in a vehicle management device 10 so as to obtain information related to the status of the vehicles. Any vehicle occupied at another disaster is deleted from the nearest vehicle table. Thus, the vehicle evaluation table 128 is produced.

Figure 4:
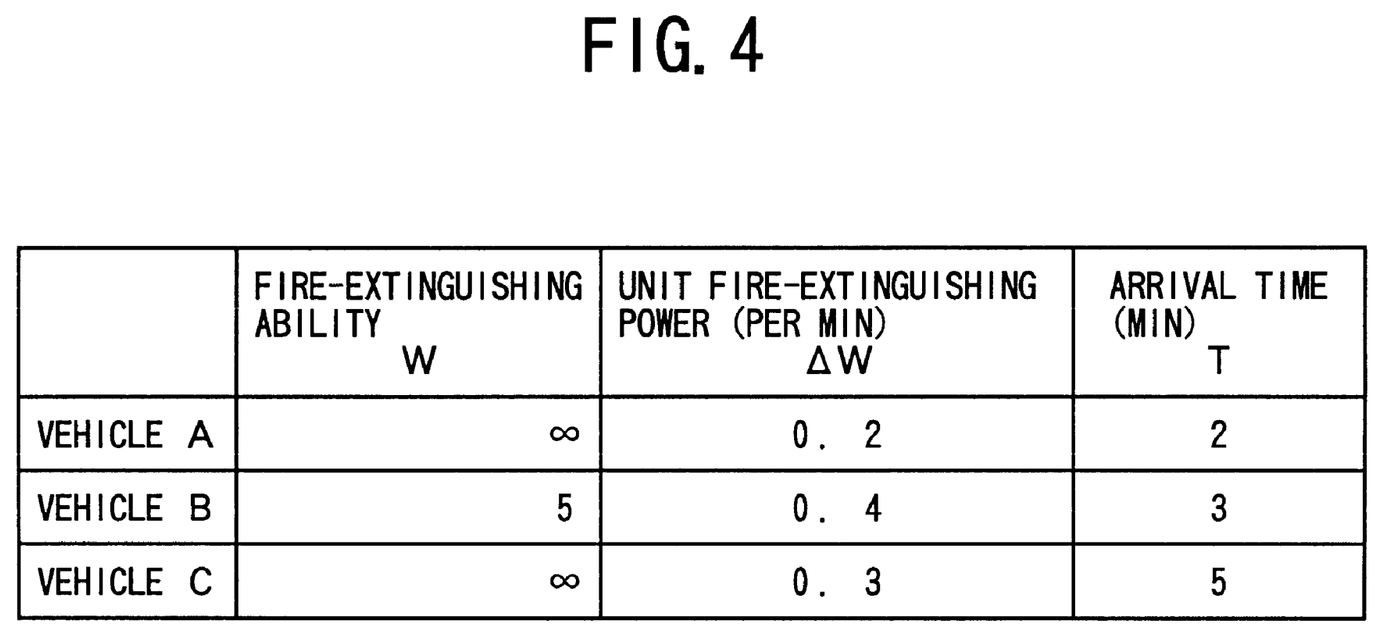
FIG. 4 is a diagram showing an example of a vehicle evaluation table.

FIG. 4 is a diagram showing an example of the vehicle evaluation table 128. In the following description, the disaster is assumed to be a fire disaster. The vehicle evaluation table 128 includes numerical data for each vehicle such as fire-extinguishing ability W, unit fire-extinguishing power (per minute) ΔW and arrival time (minutes) T.

The fire-extinguishing ability W is understood as a limited value (or unlimited time) of the fire-extinguishing ability of the vehicle and is equivalent to the available amount of water. If the water can be obtained from a river or from a large-capacity reservoir, the available amount of water is regarded as an infinite amount considering a typical time required for fire-extinguishing activity. However, the amount of water is limited if the vehicle is a specially equipped vehicle such as a tank-type vehicle. The fire-extinguishing ability W is determined based on the equipment of each vehicle and the condition of the location of the disaster.

The unit fire-extinguishing power ΔW is understood as fire-extinguishing ability (water discharge ability) per minute. The fire-extinguishing ability of a reference vehicle is defined as a unit value ("1") and other vehicles are evaluated based on the unit value. The unit fire-extinguishing power ΔW is predetermined as an initial setting.

The arrival time T is a period of time between the instant of report of the disaster and the time at which the vehicle can arrive at the field of the disaster and actually start discharging the water. The arrival time may be calculated using any one of known calculation methods.

Also, when a specific vehicle is selected individually, it is possible to provide the specific vehicle as first data of the vehicle evaluation table 128 and to select operational vehicles such that the specific data is always selected. Thereby, it is possible to select operational vehicles including the specific vehicle.

Figure 5:
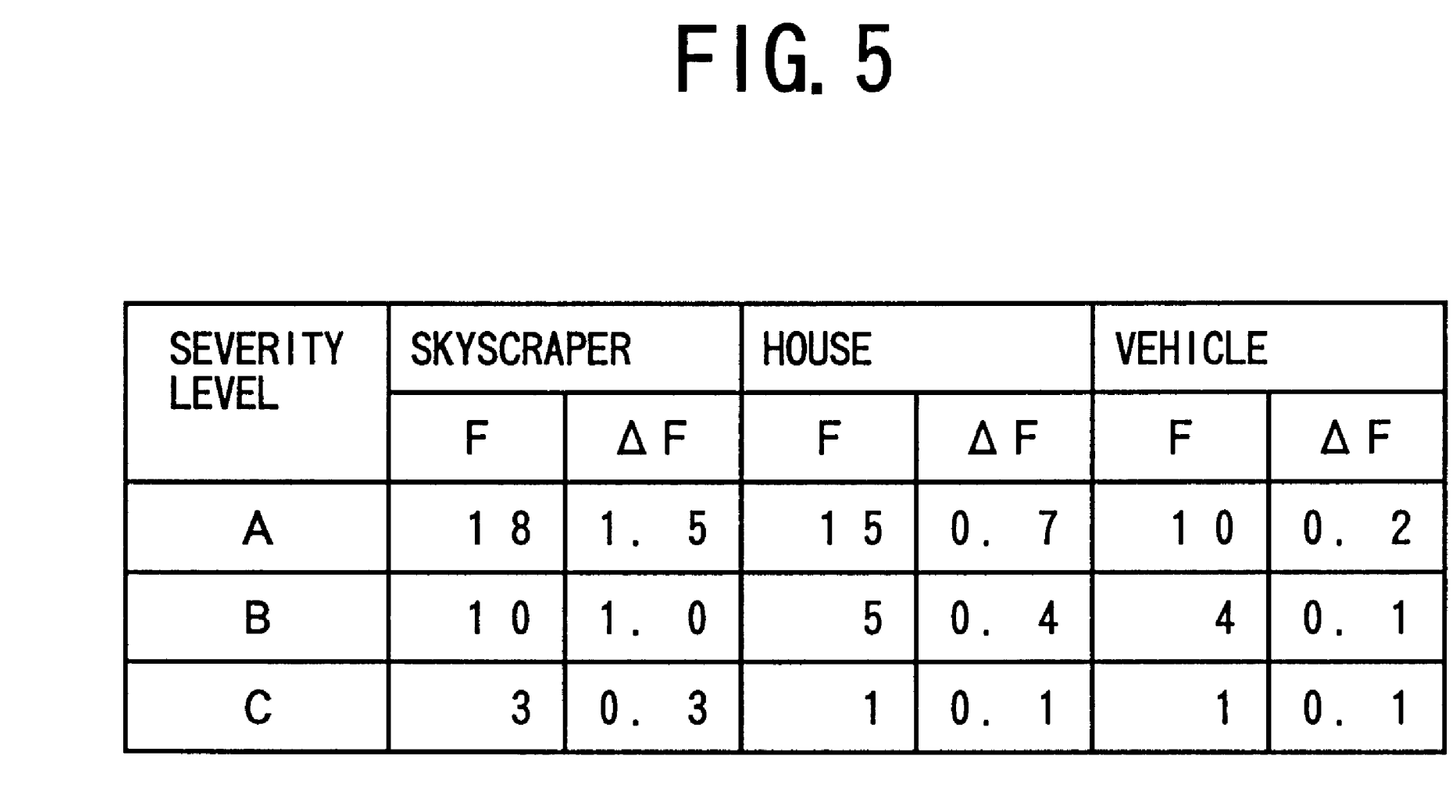
FIG. 5 is a diagram showing an example of a fire-spreading condition table.

The data input from the man-machine interface 22 is supplied to the affected object fire-spread data determining part 124 via the nearest vehicle table producing part 122. Then, using the affected object file 130 and the fire-spreading information input by the operator, the affected object fire-spread data determining part 124 obtains an initial fire power F and a fire-spreading power ΔF from the fire-spreading condition table 132.

FIG. 5 is a diagram showing an example of the fire-spreading condition table 132. The fire-spreading condition table 132 includes numerical data for a severity level of the disaster, the initial fire power F for each affected object and the fire-spreading power ΔF.

The operator determines the severity level based on the fire-spreading information provided by the reporter. For example, level A corresponds to a state where the fire is spreading vigorously, level B corresponds to a state where the fire can be seen, and level C corresponds to a state where smoke can be seen. An appropriate number of levels may be determined for each fire station.

Also, the initial fire power F is determined using the affected object file (e.g., skyscrapers, houses and vehicles) and the severity level. The initial fire power F is predetermined based on the fire-extinguishing ability W shown in FIG. 4. The fire-spreading power ΔF is a fire-spreading power per minute which is determined using the affected object file and the severity level. For example, for a level B fire of a house, the initial fire power F equals 5 and the fire-spreading power ΔF equals 0.4.

The vehicle-selecting device 120 may be extended to include other types of affected objects (wooden houses, strong houses, forests, etc.) by adding to or editing the affected object file 130. If the state of spreading of the fire is more severe than expected, the case may be easily handled by recalculating for a higher severity level.

Then, the vehicle organizing part 126 organizes the vehicles using the vehicle evaluating table 128, the initial fire power F and the fire-spreading power ΔF. The vehicle organizing process implemented by the vehicle organizing part 126 will be described with reference to FIGS. 6 to 8.

Figure 6:
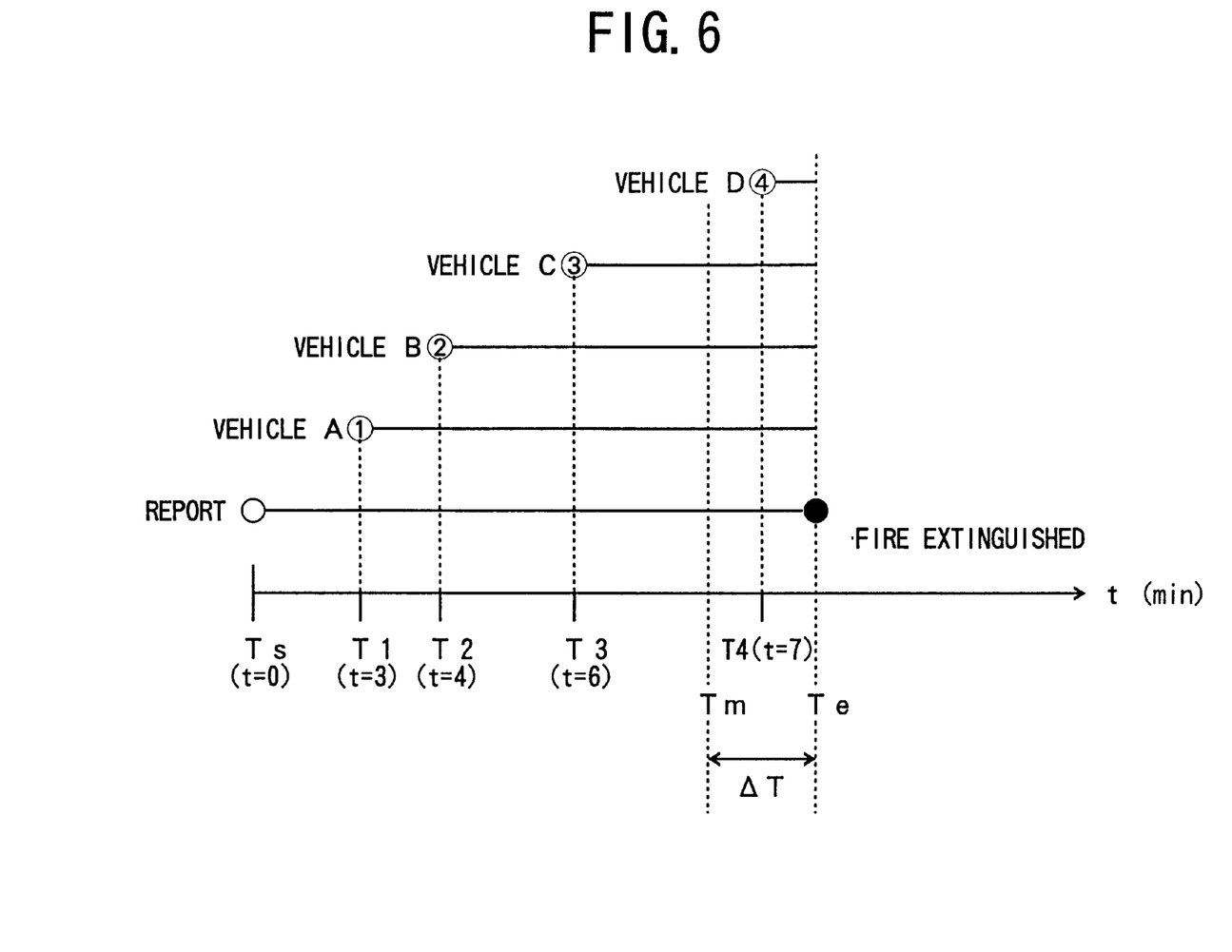
FIG. 6 shows a timing chart of an example of a vehicle organizing process.

FIG. 6 shows a timing chart of an example of the vehicle organizing process. In FIG. 6, the horizontal axis represents time t (minutes). A fire disaster is reported at Ts (t=0). In the present embodiment, vehicles A to D are sent out from the fire station. The vehicles A to D arrive at the field of the disaster at T1 to T4, respectively. In other words, T1 to T4 are instants at which the vehicles A to D start discharging the water. It is to be noted that any fire-extinguishing agent other than water may also be used. As a result of the water discharging operation by the vehicles, the fire is extinguished at Te. ΔT is a time period between Te and a certain time Tm before Te. It is assumed that the water discharge operation by the vehicle arriving during the time period ΔT does not contribute to extinguishing the fire.

As an example, for a fire reported at time Ts to be extinguished at Te, the following relationship should be satisfied:

(Total fire-extinguishing ability of the vehicles at time t)≧(Total fire-spreading power of the fire at time t)  Equation (1).

Also, the total fire-spreading power of the fire at time t satisfies the following equation (2).
(Total fire-spreading power of the fire at time t)

$$=F+\Delta F \times \text{time } t \quad \text{Equation (2)}.$$

The vehicles having arrived before time t are taken into account when calculating the total fire-extinguishing ability of the vehicles at time t. That is to say, the vehicles satisfying the following equation (3) are taken into account when calculating the total fire-extinguishing ability.

Arrival time Tx−time t<0, (x=1 to 4)  Equation (3).

Also, if the vehicle has already arrived at the field of disaster, that is to say if equation (3) is satisfied and if the following equation (4) is satisfied, the fire-extinguishing ability at time t for each vehicle W(t) satisfies the following equation(5).

(t−Tx)×unit fire-extinguishing power ΔWx <fire-extinguishing power

Wx, (x=1 to 4)  Equation (4).

fire-extinguishing power Wx(t)=(t−Tx)×unit fire-extinguishing power ΔWx, (x=1 to 4)  Equation (5).

Also, if the vehicle has already arrived at the field of disaster, that is to say if equation (3) is satisfied and the following equation (6) is satisfied, the fire-extinguishing ability at time t for each vehicle W(t) satisfies the following equation (7).

(t−Tx)×unit fire-extinguishing power ΔWx <fire-extinguishing power Wx, (x=1 to 4)  Equation (6).

fire-extinguishing power Wx(t)=fire-extinguishing power Wx, (x=1 to 4)  Equation (7).

Also, if the vehicle has not yet arrived at the field of disaster, that is to say if equation (3) is not satisfied, the fire-extinguishing ability at time t for each vehicle W(t) satisfies the following equation (7).

fire-extinguishing power Wx(t)=0  Equation (8).

Therefore, the total fire-extinguishing ability of the vehicle after t minutes can be expressed by the following equation (9).

Total fire-extinguishing ability of the vehicle after t minutes=

$$\sum_{X=1}^{N} Wx(t). \quad \text{Equation (9)}$$

In equation (9), N is the total number of operational vehicles.

Figure 7:
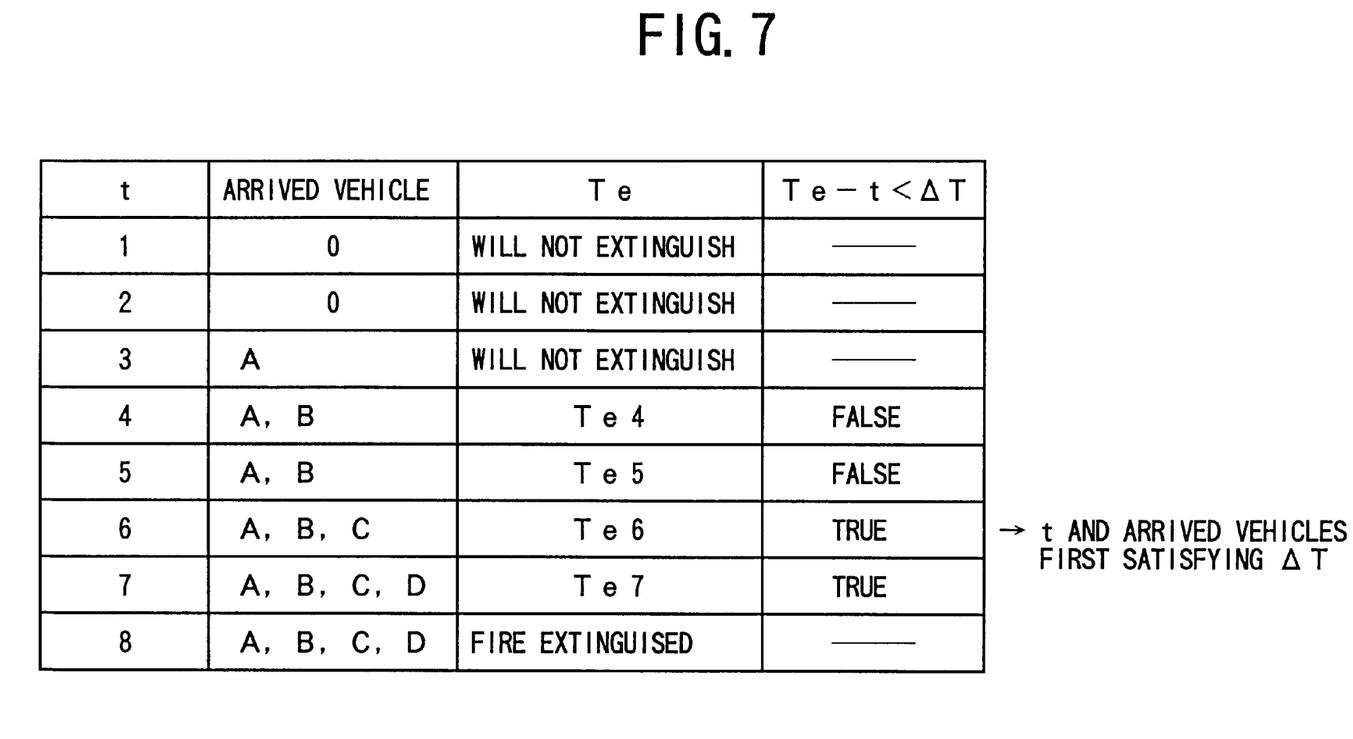
FIG. 7 shows a chart used for explaining transitions of the states of the timing chart shown in FIG. 6.

FIG. 7 shows a chart used for explaining the transitions of the states of the timing chart shown in FIG. 6. FIG. 7 is a chart including time t, arrived vehicles, fire-extinguishing time Te, and whether the relationship Te−t <ΔT is true or false. FIG. 7 will be described using the above equations (1) to (9).

When time t=3, vehicle A has arrived at the field of disaster and has started discharging water. However, because the total fire-extinguishing ability is less than the total fire-spreading power of the fire, the fire-extinguishing time Te cannot be derived.

At time t=4, vehicle B has also arrived at the field of disaster and has started discharging water. Therefore, since the total fire-extinguishing ability becomes greater than the total fire-spreading power of the fire, the fire-extinguishing time Te4 is derived. However, the relationship Te−t <ΔT is still not satisfied.

At time t=6, vehicle C has also arrived at the field of disaster and has started discharging water. Therefore, since the total fire-extinguishing ability becomes greater than at time t=4, the fire-extinguishing time Te6 is derived. The relationship Te−t<ΔT is now satisfied. Accordingly, vehicles A, B and C are selected as operational vehicles.

Also, at time t=7, vehicle D has also arrived at the field of disaster. However, since time t=7 is within the time period ΔT, it is determined that the water discharging operation of the vehicle D does not contribute to extinguishing the fire. Therefore, vehicle D is not selected as an operational vehicle.

Figure 8:
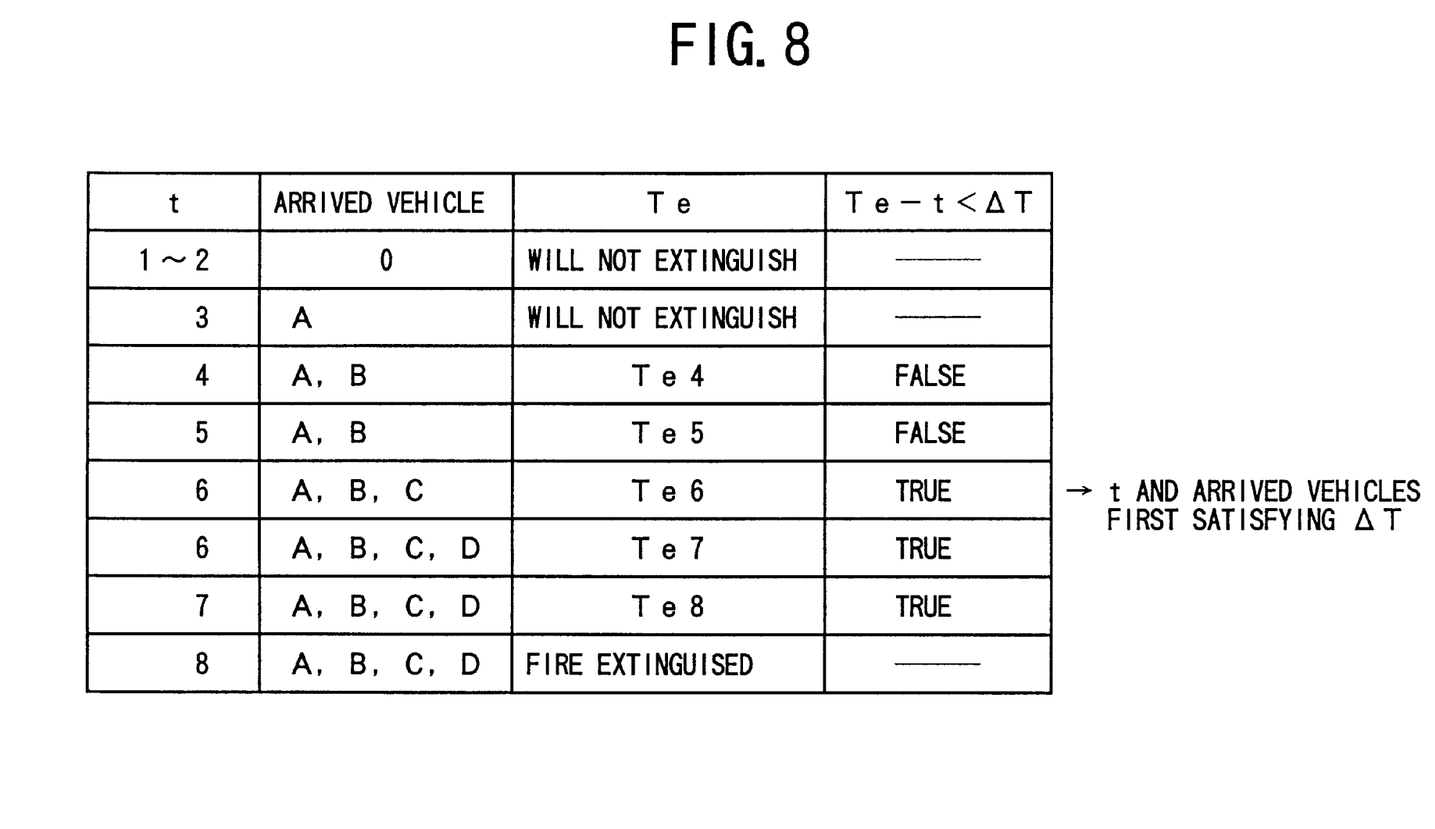
FIG. 8 shows a chart similar to FIG. 7 but including two or more vehicles arriving at the same instant.

FIG. 8 shows a chart similar to FIG. 7 but including two or more vehicles arriving at the same instant. In order to deal with such a case, the vehicles are arranged in a priority order. When two or more vehicles arrive at the same instance, the calculation is made according to the priority in a descending order. That is to say, firstly, the vehicle having the highest priority is calculated.

At time t=6, vehicles C and D have also arrived at the field of disaster and have started discharging water. In this embodiment, the priority of vehicle C is higher than the priority of vehicle D.

Then, firstly, the calculation is carried out for vehicle C having the higher priority. As a result of the calculation, the fire-extinguishing time Te6 and the relationship Te−t<ΔT are obtained. Thus, since the relationship Te−t<ΔT is satisfied for the first time, the vehicles A, B and C are selected as operational vehicles. Since it is regarded that the water discharging operation of vehicle D does not contribute to extinguishing the fire, vehicle D is not selected as an operational vehicle.

As has been described with reference to FIGS. 6 to 8, the operational vehicles are selected at the vehicle-selecting device 120.

Figure 9:
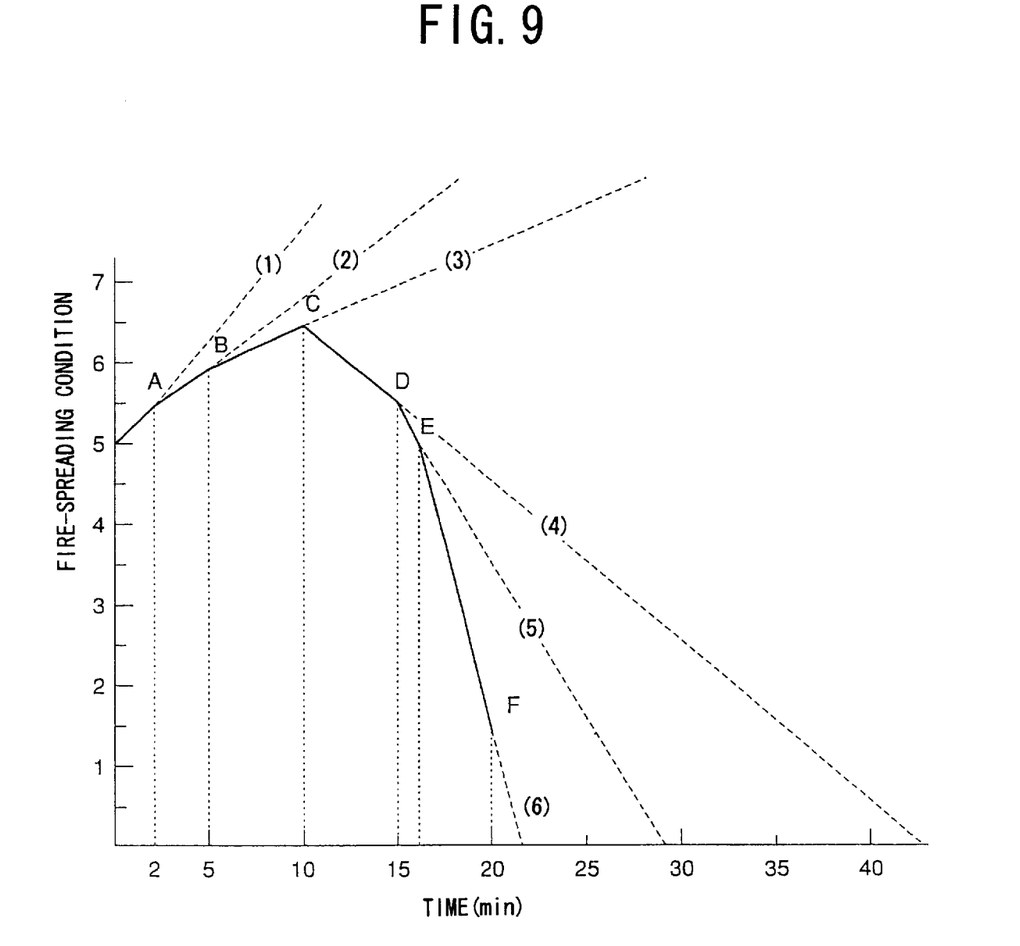
FIG. 9 illustrates an example of a graph of a condition of a fire with respect to time.

Referring now to FIG. 9, fire-spreading condition will be described for a case in which the vehicles are selected at the vehicle-selecting device 120.

FIG. 9 illustrates an example of a graph of the condition of the fire with respect to time. Line (1), indicated by a solid line and a broken line extending therefrom, is determined by the initial fire power F and the fire-spreading power ΔF. If no vehicle arrives at the field of fire, as shown by the broken line, the fire will keep spreading.

Line (2), indicated by a solid line and a broken line extending therefrom, represents a case where vehicle A has arrived at the field of fire at time t=2 and has started discharging water. Line (2) shows a reduced rate of spreading of the fire. However, as shown by the broken line, the fire is still spreading.

Line (3), indicated by a solid line and a broken line extending therefrom, represents a case where vehicle B has arrived at the field of fire at time t=5 and has started discharging water. Line (3) shows a further reduced rate of spreading of the fire. However, as shown by the broken line, the fire is still spreading.

Line (4), indicated by a solid line and a broken line extending therefrom, represents a case where vehicle C has arrived at the field of fire at time t=10 and has started discharging water. In this case, the fire starts getting smaller. The fire extinguishes at about time t=42.

Line (5), indicated by a solid line and a broken line extending therefrom, represents a case where vehicle D has arrived at the field of fire at time t=15 and has started discharging water. In this case, the fire is further reduced. The fire extinguishes at about time t=29.

Line (6), indicated by a solid line and a broken line extending therefrom, represents a case where vehicle E has arrived at the field of fire at time t=16 and has started discharging water. In this case, the fire is again further reduced. The fire extinguishes at about time t=22.

By observing such a graph, the operator can easily understand the condition from the reported instant until the instant at which the fire is extinguished. If necessary, assistance information for adding or deleting the vehicles can be obtained.

Referring again to FIG. 3, the vehicle organizing part 126 selects operational vehicles and announces the selection to the vehicle management part 12. Thus, the operational vehicles are reserved. The operational vehicle data is stored in a vehicle management table 14 so that the reserved operational vehicles will not be used for other disasters.

Upon receipt of the announcement from the vehicle management part 12 announcing that the operational vehicles have been reserved, the vehicle organizing part 126 instructs the command producing part 26 to produce a command. Then, the command producing part 26 produces the command and sends it as electronic data to a station 200 where the selected operational vehicle belongs and to the selected operational vehicle 212. The command includes data such as a type of the disaster, an address, affected objects, operational vehicles, and a map.

At the station 200 where the selected operational vehicle belongs, a command tone, a voice signal and the command are output from output means such as a terminal display of a station terminal 204 and a printer 206. Also, a command tone and a voice signal are sent to the selected operational vehicle 212. The command center 100 and the station 200 are connected by connections such as a WAN 300 via routers 108 and 202 of the command center 100 and the station 200, respectively, or an audio line. The audio line is connected to a receiving telephone 208 which is in turn connected to a speaker 210.

Figure 10:
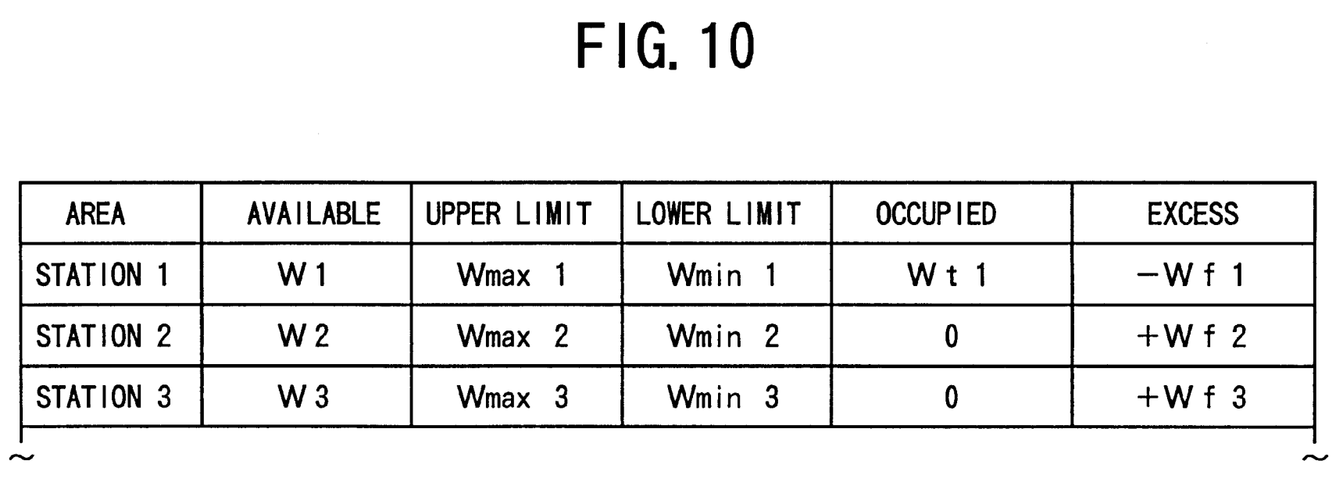
FIG. 10 is diagram showing an available fire-extinguishing power table.

In the case of a fire, the operational vehicle is sent to the location of the fire, causing the fire-extinguishing ability of the station to which the operational vehicle belongs and the nearby stations to be reduced. This may cause a problem in the case of an occurrence of another disaster. The vehicle-selecting device 120 produces an available fire-extinguishing power table as shown in FIG. 10, and demands assistance from other stations according to the available fire-extinguishing power table. The available fire-extinguishing power table includes available fire-extinguishing power, occupied fire-extinguishing power, upper limit fire-extinguishing power, lower limit fire-extinguishing power and excessive fire-extinguishing power for each station.

The available fire-extinguishing power is a sum of fire-extinguishing power of all vehicles belonging to each station and can be calculated automatically. The upper limit fire-extinguishing power is an upper-limit value of the fire-extinguishing power which may be used as assistance for other stations. For example, station 2 is capable of sending Wf2 as assistance for other stations as given by the following equation (10):

$$W2-Wmax2=Wf2, \quad \text{Equation (10)},$$

where W2 is the available fire-extinguishing power, Wmax is the upper limit fire-extinguishing power and Wf2 is the excessive fire-extinguishing power.

The lower limit fire-extinguishing power is an upper-limit value of the fire-extinguishing power assistance required from other stations. The occupied fire-extinguishing power is the fire-extinguishing power currently sent to the location of the disaster according to the command. The excessive fire-extinguishing power is a numerical value representing an excessive amount of the fire-extinguishing power enabling sending the operational vehicle for assisting another station. For station 1, the excessive fire-extinguishing power can be calculated by the following equations (11) and (12).

$$\text{Remaining fire-extinguishing power of station } 1 = W1-Wt1, \quad \text{Equation (11)},$$

where W1 is the available fire-extinguishing power and Wt1 is the occupied fire-extinguishing power.

$$\text{Excessive fire-extinguishing power} = \text{Remaining fire-extinguishing power of station } 1-Wmin1, \quad \text{Equation (12)},$$

where Wmin1 is the lower-limit fire-extinguishing power.

If the value of the excessive fire-extinguishing power calculated from equation (12) is negative, assistance is required from other stations. If there is any station requiring assistance from other stations, a station having a positive value for the excessive fire-extinguishing power is automatically selected. The vehicle can be sent from the thus-selected station.

In the case of a very severe disaster such as an earthquake, the remaining capability of the fire department (of the entire city) may decrease or there may be a shortage of the fire-extinguishing power. In such a case, the available fire-extinguishing power table of FIG. 10 is extended to the entire fire department so that assistance can be demanded from other fire organizations.

Figure 11:
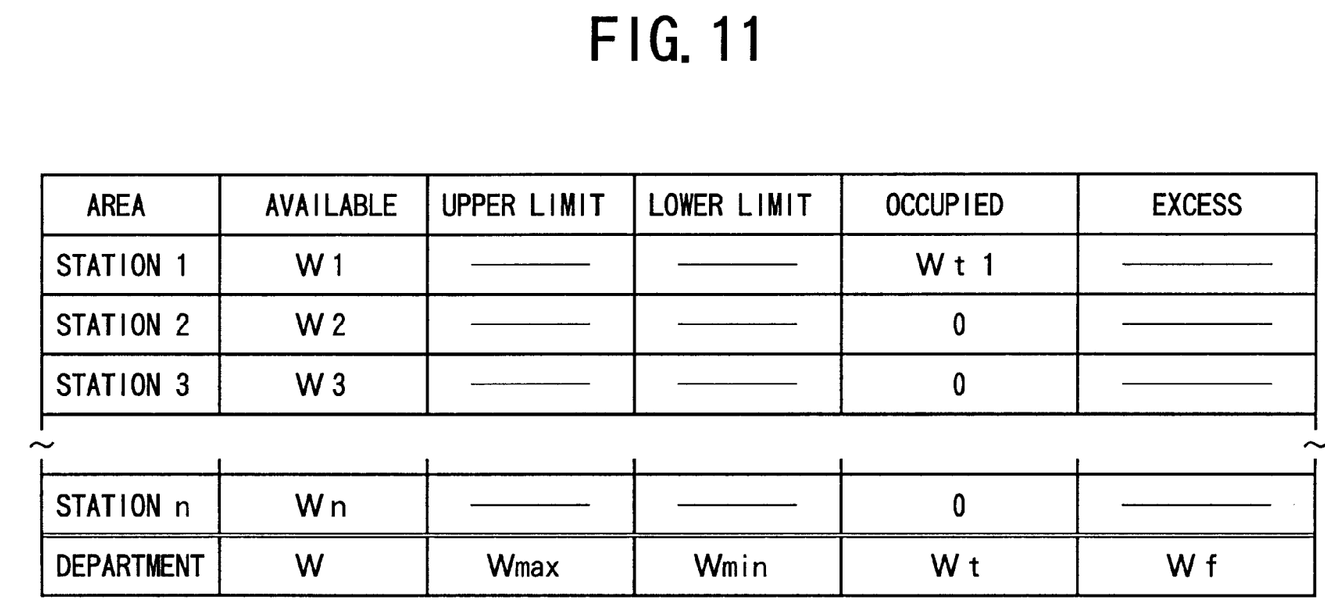
FIG. 11 is a diagram showing an available fire-extinguishing power table which numerically shows the decision of demanding assistance from other fire organizations.

FIG. 11 is a diagram showing an available fire-extinguishing power table which numerically shows the decision of demanding assistance from other fire organizations. The available fire-extinguishing power table of FIG. 11 includes available fire-extinguishing power, occupied fire-extinguishing power, upper limit fire-extinguishing power, lower limit fire-extinguishing power and excessive fire-extinguishing power for each station and for a fire department (i.e., total of all stations in the fire department).

As has been described with reference to FIG. 10, if the excessive fire-extinguishing power of the fire department Wf is positive, the fire department is capable of sending assistance vehicles to other fire organizations. The vehicles to be sent are selected such that the excessive fire-extinguishing power does not take a negative value.

If the excessive fire-extinguishing power of the fire department Wf is negative, the fire department may demand assistance vehicles from other fire organizations. In this case, if there is a need to consult with the head of the fire department, the excessive fire-extinguishing power of the fire department Wf takes a negative value. Then, a warning may be outputted when the head of the fire department decides to demand assistance from other fire departments.

Further, the present invention is not limited to these embodiments, but variations and modifications may be made without departing from the scope of the present invention.

The present application is based on Japanese priority application No. 11-249223 filed on Sept. 2, 1999, the entire contents of which are hereby incorporated by reference.

What is claimed is:

1. A device for selecting vehicles to be sent to a site of a fire, said device comprising:

first means provided with a first table in which fire-extinguishing ability data and arrival time data for each vehicle are stored as numerical data, said arrival time data representing time required for said vehicle to arrive at the fire site, and a second table in which initial fire power data and fire-spreading rate data are stored as numerical data; and second means for deriving a relationship between total fire-extinguishing ability of vehicles and total fire-spreading power of the fire with respect to time, and for selecting vehicles to be sent to the fire site based on said relationship.

2. The device as claimed in claim 1, further comprising third means for producing a command for said fire and sends said command to a fire station to which the selected vehicle belongs.

3. The device as claimed in claim 1, wherein said second table is organized such that said initial fire power data and said fire-spreading rate data are provided for each type of affected object.

4. The device as claimed in claim 1, wherein said second table is organized such that said initial fire power data and said fire-spreading rate data are provided for each severity level.

5. The device as claimed in claim 1, wherein said second means derives a fire-extinguishing time based on the total fire-extinguishing ability of vehicles at the fire site and the total fire-spreading power of the fire so that any vehicle arriving at the fire site during a predetermined period before the fire-extinguishing time is excluded from selection as a vehicle to be sent to the fire site.

6. The device as claimed in claim 1, further comprising:

a third table in which are stored a total fire-extinguishing power of vehicles not presently sent to the fire site from the fire station, an upper limit value of total fire-extinguishing power above which vehicles can be sent to a site outside the region covered by the present station, and a lower limit value of total fire-extinguishing power below which assistance is required from a site outside the region covered by the present station, wherein if said total fire-extinguishing power is below said lower limit, assistance is demanded from another station having a total fire-extinguishing power which exceeds said upper value.

7. The device as claimed in claim 1, further comprising:

a fourth table in which are stored a total fire-extinguishing power of vehicles not presently sent to the fire site from the fire department, an upper limit value of total fire-extinguishing power above which vehicles can be sent to a site outside the region covered by the present fire department, and a lower limit value of total fire-extinguishing power below which assistance is required from a site outside the region covered by the present fire department, wherein if said total fire-extinguishing power is below said lower limit, assistance is demanded from another fire department having a total fire-extinguishing power which exceeds said upper value.

8. A method comprising the steps of:

a) reading a vehicle table to obtain fire-extinguishing ability data of a vehicle and arrival time data representing time required for the vehicle to arrive at a site of a fire;

b) reading a fire-spreading condition table to obtain initial fire power data of said fire site and fire-spreading rate data;

c) deriving a relationship between total fire-extinguishing ability of vehicles at the fire site and total fire-spreading power of the fire based on data read out from said vehicle table and from said fire-spreading condition table; and d) selecting vehicles to be sent to the fire site based on said relationship.

9. The method as claimed in claim 8, wherein said step d) further includes the steps of:

deriving a fire-extinguishing time based on the total fire-extinguishing ability of vehicles at the fire site and the total fire-spreading power of the fire; and excluding any vehicle arriving at the fire site during a predetermined period before the fire-extinguishing time from the selection of the vehicles to be sent to the fire site.

10. A system comprising:

a vehicle-selecting device which selects vehicles to be sent to a site of a fire by estimating a condition of the fire using a vehicle table in which fire-extinguishing ability data and arrival time data for each vehicle are stored as numerical data and a fire-spreading condition table in which initial fire power data and fire-spreading rate data are stored as numerical data;

a transmitting device which transmits a command to said selected vehicles or to a station to which said selected vehicles belong; and an output device which outputs said command.

11. A device for selecting vehicles to be sent to a location of a disaster, said device comprising:

storage means provided with a vehicle table in which disaster-handling ability data and arrival time data for each vehicle are stored as numerical data, said arrival time data representing time required for said vehicle to arrive at the location of the disaster, and a disaster condition table for each affected object in which change of condition of the disaster is stored as numerical data; and a vehicle organizing part deriving a relationship between total disaster-handling ability of vehicles and total change of condition of the disaster with respect to time, and selecting vehicles to be sent to the location of the disaster based on said relationship.

\* \* \* \* \*

UNITED STATES PATENT AND TRADEMARK OFFICE
CERTIFICATE OF CORRECTION

PATENT NO. : 6,311,124 B1
DATED : October 30, 2001
INVENTOR(S) : Koichi Maeda et al.

It is certified that error appears in the above-identified patent and that said Letters Patent is hereby corrected as shown below:

<u>Title page,</u>
Item [73], Assignee, please change "FIjitsu" to -- Fujitsu --.

Signed and Sealed this

Twenty-sixth Day of March, 2002

Attest:

Attesting Officer

JAMES E. ROGAN
Director of the United States Patent and Trademark Office